United States Patent
Westrich et al.

(10) Patent No.: US 12,009,563 B2
(45) Date of Patent: Jun. 11, 2024

(54) FUEL CELL SYSTEM

(71) Applicant: Adaptive Energy, LLC, Ann Arbor, MI (US)

(72) Inventors: Thomas Westrich, Ann Arbor, MI (US); Christopher Ridgard, Ann Arbor, MI (US)

(73) Assignee: Adaptive Energy, LLC, Ann Arbor, MI (US)

( * ) Notice: Subject to any disclaimer, the term of this patent is extended or adjusted under 35 U.S.C. 154(b) by 0 days.

(21) Appl. No.: 18/170,144

(22) Filed: Feb. 16, 2023

(65) Prior Publication Data

US 2023/0261237 A1 Aug. 17, 2023

Related U.S. Application Data

(60) Provisional application No. 63/311,021, filed on Feb. 16, 2022.

(51) Int. Cl.
*H01M 8/2475* (2016.01)
*B64U 50/19* (2023.01)
*B64U 50/32* (2023.01)
*H01M 8/12* (2016.01)

(52) U.S. Cl.
CPC .......... *H01M 8/2475* (2013.01); *B64U 50/19* (2023.01); *B64U 50/32* (2023.01); *H01M 2008/1293* (2013.01)

(58) Field of Classification Search
CPC ....... H01M 8/2475; H01M 2008/1293; H01M 8/04225; H01M 8/1231; H01M 8/04007; B64U 50/19; B64U 50/32
See application file for complete search history.

(56) References Cited

U.S. PATENT DOCUMENTS

| | | | |
|---|---|---|---|
| 6,749,799 B2 | 6/2004 | Crumm et al. | |
| 7,695,841 B2 | 4/2010 | Crumm et al. | |
| 7,718,113 B2 | 5/2010 | Crumm et al. | |
| 7,767,329 B2 | 8/2010 | Crumm et al. | |
| 8,080,346 B2 | 12/2011 | Crumm et al. | |
| 8,247,120 B2 | 8/2012 | Crumm et al. | |
| 8,288,055 B2 | 10/2012 | Halloran et al. | |
| 8,352,097 B2 | 1/2013 | Crumm et al. | |
| 2004/0247960 A1* | 12/2004 | Sato | C10L 1/1852 44/457 |
| 2009/0079263 A1 | 3/2009 | Crumm et al. | |
| 2010/0183929 A1 | 7/2010 | Crumm et al. | |
| 2010/0183930 A1 | 7/2010 | Labreche et al. | |
| 2010/0273068 A1 | 10/2010 | Crumm et al. | |
| 2010/0310948 A1 | 12/2010 | Ernst et al. | |
| 2010/0316919 A1 | 12/2010 | Ernst et al. | |
| 2011/0053019 A1* | 3/2011 | Takahashi | H01M 8/04223 429/423 |
| 2011/0071706 A1* | 3/2011 | Crumm | B64D 31/06 701/3 |
| 2011/0189572 A1 | 8/2011 | Crumm et al. | |
| 2011/0189578 A1 | 8/2011 | Crumm et al. | |
| 2011/0189587 A1 | 8/2011 | Crumm et al. | |
| 2011/0195333 A1 | 8/2011 | Crumm et al. | |
| 2011/0195334 A1 | 8/2011 | Crumm et al. | |
| 2011/0262819 A1 | 10/2011 | Crumm et al. | |
| 2012/0052405 A1 | 3/2012 | Crumm et al. | |
| 2019/0051920 A1* | 2/2019 | Pan | H01M 8/1213 |
| 2020/0096157 A1* | 3/2020 | Kim | F17C 13/002 |
| 2020/0180774 A1* | 6/2020 | Rainville | B60L 50/70 |
| 2020/0182408 A1* | 6/2020 | Nagura | B67D 7/78 |

FOREIGN PATENT DOCUMENTS

| | | |
|---|---|---|
| JP | 2012028269 A | 2/2012 |
| JP | 5379962 B2 | 10/2013 |

OTHER PUBLICATIONS

International Search Report & Written Opinion for Application No. PCT/US2023/062730; dated May 17, 2023; 9 pp.

* cited by examiner

*Primary Examiner* — Muhammad S Siddiquee
(74) *Attorney, Agent, or Firm* — Bodman PLC

(57) ABSTRACT

A fuel cell system includes a fuel cell and a fuel system. The fuel cell includes a housing and a fuel cell stack positioned in the housing. The fuel cell stack is configured to produce an electrochemical reaction from a fuel and air to output electricity. The fuel system includes a fuel source, a fuel vaporizer, and fuel lines through which fuel flows from the fuel source to the fuel vaporizer and from the fuel vaporizer to the fuel cell stack. The fuel vaporizer includes a conductive tube through which the fuel flows, the conductive tube being in contact with the housing to conduct heat from the housing to the fuel to vaporize the fuel.

19 Claims, 4 Drawing Sheets

FUEL CELL SYSTEM

CROSS-REFERENCE TO RELATED APPLICATION(S)

This application claims priority to and the benefit of U.S. Provisional Application No. 63/311,021, filed Feb. 16, 2022, the entire disclosure of which is incorporated by reference herein.

TECHNICAL FIELD

This disclosure relates to power systems and, in particular, fuel cell systems.

BACKGROUND

Solid oxide fuel cells deliver fuel from a source, such as propane from a tank, in a vapor state to a fuel cell stack at which an electrochemical reaction is performed to output electricity. However, in order to deliver the fuel in the vapor state, the fuel source typically requires that the tank be in certain orientations to provide deliver the fuel in the vapor state to the fuel cell stack.

SUMMARY

Disclosed herein are implementations of fuel cell systems. In one implementation, a fuel cell system includes a fuel cell and a fuel system. The fuel cell includes a housing and a fuel cell stack positioned in the housing. The fuel cell stack is configured to produce an electrochemical reaction from a fuel and air to output electricity. The fuel system includes a fuel source, a fuel vaporizer, and fuel lines through which fuel flows from the fuel source to the fuel vaporizer and from the fuel vaporizer to the fuel cell stack. The fuel vaporizer includes a conductive tube through which the fuel flows, the conductive tube being in contact with the housing to conduct heat from the housing to the fuel to vaporize the fuel.

The fuel cell may be a solid oxide fuel cell that has an operating temperature of between approximately 600 and 1,000 degrees Celsius. The housing may be insulated and have a surface temperature that does not exceed 150 degrees Celsius during operation of the fuel cell. The fuel system may deliver the fuel to the fuel cell stack at up to 400 grams/hour. The fuel source may be a first fuel tank. The fuel system may include a second fuel tank. The fuel may flow from the first tank to the fuel vaporizer through one of the fuel lines. During a normal operation phase after a startup phase, the fuel may flow from the first tank to the fuel vaporizer and from the fuel vaporizer to the second fuel tank in the vapor state. The regulator may be arranged between the second fuel tank and the fuel cell stack. The regulator may be selectively operated to control flow of the fuel from the second fuel tank to the fuel cell stack. The flow of the fuel from the first fuel tank through the fuel vaporizer to the second fuel tank may be controlled by operating the regulator. The first fuel tank may be positioned at least partially above the second fuel tank. The first fuel tank may include a fuel outlet that is positioned at an approximate mid-height thereof. The first fuel tank may be elongated in a substantially horizontal direction.

In an implementation, an unmanned aerial vehicle includes a fuselage, a propulsion system, and a fuel cell system. The propulsion system is coupled to the fuselage and is configured to propel the unmanned aerial vehicle through the air. The propulsion system includes at least one electric motor. The fuel cell system is configured to provide power to the at least one electric motor. The fuel cell system includes a fuel cell having a housing, a fuel cell stack positioned in the housing, and a fuel system. The fuel cell stack is configured to produce an electrochemical reaction from a fuel and air to output electricity. The fuel system includes a fuel source, a fuel vaporizer, and fuel lines through which the fuel flows from the fuel source to the fuel vaporizer and from the fuel vaporizer to the fuel cell stack. The fuel vaporizer includes a conductive tube through which the fuel flows, the conductive tube being in contact with the housing to conduct heat from the housing to the fuel to vaporize the fuel.

In an implementation, a method for operating a fuel cell includes: transferring a fuel from a fuel source to a fuel vaporizer; heating the fuel with the vaporizer for the fuel to be in a vapor state; transferring the fuel in the vapor state from the vaporizer to a fuel tank; transferring the fuel in the vapor state from the fuel tank to a fuel cell stack; and outputting electricity by performing an electrochemical reaction with the fuel cell stack and the fuel transferred thereto.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
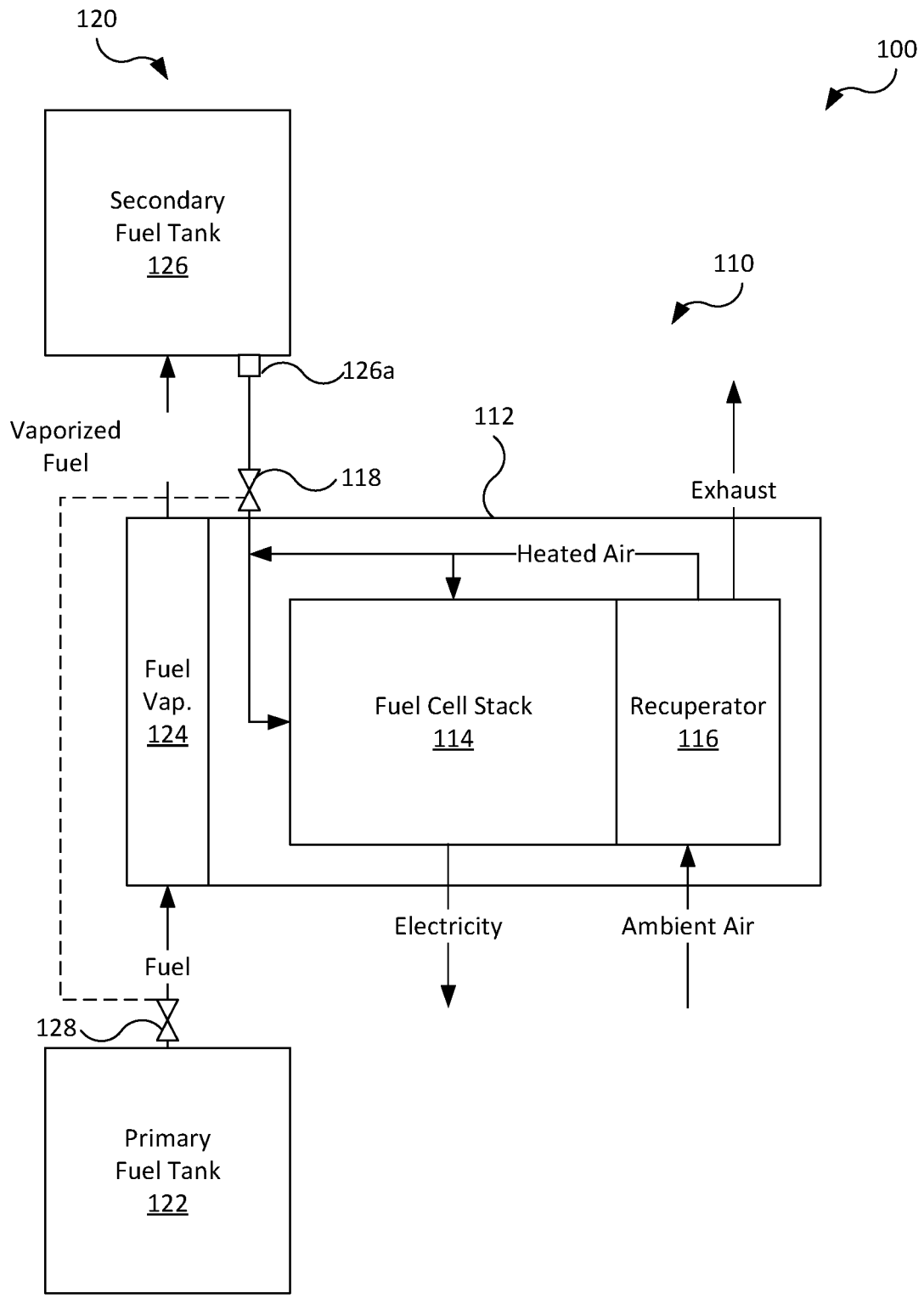
FIG. 1 is a schematic view of a solid oxide fuel cell system having a fuel vaporizer.

Referring to FIG. 1, a solid oxide fuel cell system 100 generally includes a solid oxide fuel cell (SOFC) 110 and a fuel system 120.

The solid oxide fuel cell (SOFC) 110 generally includes a housing 112 that contains a fuel cell stack 114 and a recuperator 116. The fuel cell stack 114 produces an electrochemical reaction with fuel from the fuel system 120 and air (e.g., from ambient) to output electricity. The fuel cell stack 114 may, for example, operate at between 600 and 1,000 degrees Celsius.

Figure 2:
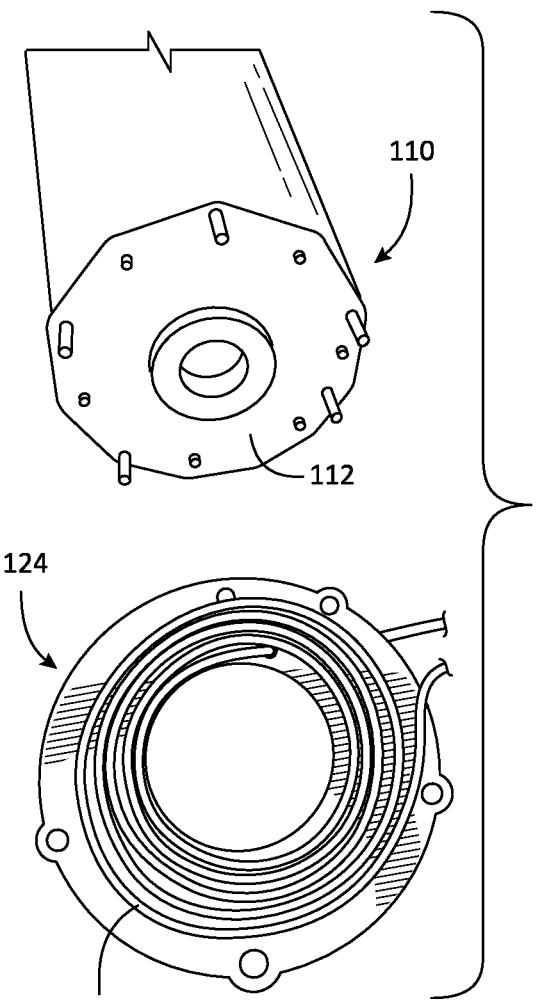
FIG. 2 is a perspective view of a solid oxide fuel cell and the fuel vaporizer in a disassembled state.
Figure 3:
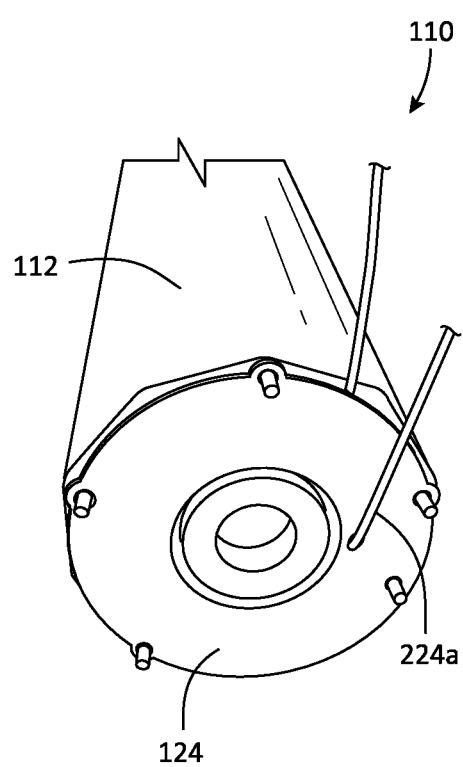
FIG. 3 is a perspective view of the solid oxide fuel cell and the fuel vaporizer in an assembled state.

The housing 112 may be a structure that directly surrounds the fuel cell stack 114, such that air flowing to the fuel cell stack 114 also contacts interior surfaces of the housing 112. The housing 112 may be insulated, such the temperature of outer surfaces of the housing 112 may, for example, be maintained below between 75 and 150 degrees Celsius (e.g., approximately 100 degrees Celsius or lower). The housing 112 may, as shown in FIGS. 2-3, be cylindrical with substantially planar ends. In other embodiments, the housing 112 may have other shapes (e.g., being a rectangular prism). The fuel cell system 100 may further include an enclosure (not shown) that surrounds the solid oxide fuel cell system 100, including one or more aspects of the fuel system 120 (e.g., a fuel vaporizer 124 as discussed in further detail below).

In the example shown, the fuel cell stack 114 includes multiple tubes (not illustrated) that each include an interior layer that forms an anode, an exterior layer that forms a cathode, and an intermediate layer therebetween that forms an electrolyte. Fuel is delivered from the fuel system 120 through the anode side of the tubes of the fuel cell stack 114. As discussed in further detail below, the fuel system 120 is configured to store, provide, and vaporize the fuel (e.g., propane) before being delivered into the fuel cell stack 114.

The vaporized fuel is delivered from the fuel system 120 into a fuel inlet of the housing 112 and the fuel cell stack 114, where the vaporized fuel is mixed with air to form a fuel-air mixture. The SOFC 110 additionally includes a regulator 118 (e.g., a valve or control valve) that controls the amount of the vaporized fuel delivered into the fuel cell stack 114. For example, the regulator 118 may permit delivery of up to approximately 400 grams per hour of fuel (e.g., up to approximately 200 g/hr, more or less), which may depend on the electrical output of the fuel cell 110. For example, for a fuel cell having a maximum electrical output of approximately 450 watts, the regulator 118 may be selectively operated (e.g., with an electronic control device) to permit fuel flow at a rate of between 0 g/hr and 300 g/hr. As used herein, the term approximately may refer to a range within 10% of a given value (e.g., approximately 400 grams/hour may include any value from 360 to 440 grams/hour). In the context of temperature, the term approximately is used with reference to Kelvin.

The fuel-air mixture flows across a catalytic substrate (not illustrated) that precedes each tube (e.g., in a manifold) or is associated with each tube (e.g., inside an inlet end thereof). The catalytic substrate may, for example, include platinum or another noble metal. The catalytic substrate functions to reform the fuel-air mixture into a gas blend which includes hydrogen and carbon monoxide. From the catalytic substrate, the reformed fuel and air mixture flows through the interior of each tube (i.e., to the anodes formed thereby).

Exhaust from the tubes of the fuel cell stack 114 may be combusted and then flow to the recuperator 116, which functions as a heat exchanger that heats ambient air with heat from the exhaust. The ambient air and the exhaust are not mixed. From the recuperator 116, the heated air is delivered both to the interior of the tubes (i.e., the anodes in the fuel-air mixture) and to the exterior of the tubes (i.e., the cathodes formed thereby).

Still referring to FIG. 1, the fuel system 120 generally includes a primary fuel tank 122, a fuel vaporizer 124, a secondary fuel tank 126, and fuel lines extending therebetween and to the fuel cell 110 and through which the fuel flows.

The primary fuel tank 122 is configured to contain the fuel in a liquid state and may be further configured to contain the fuel in vapor and/or mixed states (e.g., as the primary fuel tank 122 is emptied of fuel). Fuel is delivered from the primary fuel tank 122 to the fuel vaporizer 124 in a liquid, mixed, or vapor state. For example, starting with the primary fuel tank 122 being full of fuel, the fuel may initially be delivered in a liquid state (e.g., due to higher pressure therein from a relatively large quantity of the fuel therein) and/or because an outlet thereof is positioned below a liquid fuel level, and later be delivered in a vapor state (e.g., due to lower pressure therein with a relatively smaller quantity of the fuel) and/or when the outlet is above the liquid fuel level. The primary fuel tank 122 may store the fuel therein at a pressure, for example, of up to 200 pounds per square inch (e.g., up to approximately 100 psi). The primary fuel tank 122 may also be referred to as a fuel source, or a first or upstream first fuel source or fuel tank.

The fuel may be propane (as referenced above), butane, pentane, methanol, ethanol, propanol, or another fuel (e.g., having a vapor temperature at approximately 5 psi of between 50 and 80 degrees Celsius and/or a vapor pressure of approximately 0 to 200 psi at 20 degrees Celsius).

The fuel is delivered from the primary fuel tank 122 by one of the fuel lines to the fuel vaporizer 124. The fuel vaporizer 124 is configured for the fuel leaving the fuel vaporizer 124 to be in the vapor state, which may be referred to as vaporized fuel or in vapor form. That is, the fuel vaporizer 124 is configured to vaporize the fuel that is received from the primary fuel tank 122, which may be received a liquid, mixed, or vapor state. More particularly, and as discussed in further detail below, the fuel vaporizer 124 is configured to vaporize the fuel using heat output by the fuel cell 110.

The vaporized fuel is delivered from the fuel vaporizer 124 to the secondary fuel tank 126 in the vapor state during normal operation (e.g., steady state operation), which is then delivered from the secondary fuel tank 126 to the fuel cell 110 in the vapor state (e.g., to be mixed with air and subsequently delivered to the fuel cell stack 114). For example, the secondary fuel tank 126 may include a vapor-phase takeoff 126a. As referenced below, during startup operation, the fuel may pass in liquid form from the primary fuel tank 122 through the fuel vaporizer 124 to the secondary fuel tank 126. The vapor-phase takeoff is configured and functions to release the fuel in vapor form from the secondary fuel tank 126, but not in liquid form, to the fuel cell stack 114 (e.g., being positioned at an upper portion or end of the tank at which the fuel in vapor form is under pressure and released). The secondary fuel tank 126 may have a volumetric capacity that is smaller than the primary fuel tank (e.g., less than 50%, 30%, 15%, 10% or less than the volumetric capacity of the primary fuel tank 122). In one example, the primary fuel tank 122 has a capacity of approximately 8 liters, while the secondary fuel tank 126 has a capacity of approximately 2 liters. The secondary fuel tank 126 may also be referred to as a fuel source, or a second or downstream fuel source or fuel tank.

In the embodiment illustrated in solid lines, all fuel that is delivered from the primary fuel tank 122 to the fuel cell stack 114 passes through the fuel vaporizer 124 and the secondary fuel tank 126. Alternatively, the secondary fuel tank 126 may be omitted or bypassed in which case the vaporized fuel is delivered to the fuel cell 110 without passing through an intermediate fuel tank or other storage device. For example, as illustrated in dashed lines, the fuel system 120 may include a bypass valve 128 that is selectively operated to deliver fuel from the primary fuel tank 122 to the fuel cell stack 114 without passing through the fuel vaporizer 124 and/or the secondary fuel tank 126 (e.g., diverting fuel to the regulator 118, as shown, or the bypass valve 128 functioning as a regulator or including another regulator associated therewith). The bypass valve 128 may be operated by the same control system that operates the regulator 118, for example, causing the bypass valve 128 to allow fuel to bypass the fuel vaporizer 124 and the secondary fuel tank 126 and possibly to prevent fuel from flowing to the fuel vaporizer 124 and the secondary fuel tank 126. In a primary embodiment, fuel flow is otherwise not selectively controlled between the primary fuel tank 122, the fuel vaporizer 124, and the secondary fuel tank 126 (e.g., no valve is positioned therebetween to selectively control flow therebetween). Rather, flow occurs therebetween as a result of the regulator 118 being operated to release fuel into the fuel cell stack 114.

Referring to FIG. 2, the fuel vaporizer 124 is configured to transfer heat from the fuel cell 110 to the fuel to vaporize the fuel. In the embodiment shown, the fuel vaporizer 124 is configured to transfer heat from the housing 112 to the fuel. More particularly, the fuel vaporizer 124 includes a conductive tube 224a that is formed of a highly thermally conductive material, such as aluminum. For example, the conductive tube 224a of the fuel vaporizer 124 may be an aluminum tube having an outer diameter of approximately 0.125 inches.

The conductive tube 224a is configured to conduct heat from the fuel cell 110 and, in particular, is in physical contact with the housing 112 of the fuel cell 110 to transfer sufficient heat to the fuel to vaporize the fuel (e.g., to above −20 degrees Celsius, 0 degrees Celsius, or above 50 degrees Celsius, given the pressure of the fuel, such as between 50 and 80 degrees Celsius), considering the initial temperature, pressure, and flow rate of the fuel through the conductive tube 226a. For example, the fuel in the fuel vaporizer 124 may be at pressures up to 250 psi and at temperatures as low as approximately minus 50 degrees Celsius, while the fuel may leave the fuel vaporizer 124 at between approximately 0 and 40 degrees Celsius (or higher) and at pressures of approximately 100 to 150 psi.

As shown in FIG. 2, the conductive tube 224a is positioned against one of the planar ends of the insulated housing 112. To provide the conductive tube 224a with sufficient length to vaporize the fuel in varying conditions (e.g., ambient temperatures, fuel pressure, and fuel amount), the conductive tube 224a may have a convoluted shape (e.g., spiral, as shown) that is in contact with the housing 112 to receive the heat therefrom. For example, the conductive tube 224a may have a length of between one foot and three feet (e.g., approximately two feet, as shown) that is in contact with the housing 112. In the case of fuel cells 110 requiring higher flow rates of the fuel (e.g., for greater electrical output, such as greater than 450 watts), the length of the conductive tube 224a in contact with the insulated housing 112 may be greater than three feet while increasing the flow rate of the fuel a corresponding amount to achieve the electrical output. The conductive tube 224a may have different convoluted shapes (e.g., serpentine) and/or contact different portions of the housing 112 (e.g., wrapping around cylindrical surfaces and/or other surfaces of the housing 112 having different shapes). A protective plate (shown, not labeled) may be positioned over the conductive tube 224a to protect and/or press the conductive tube 224a against the outer surface of the housing 112.

In other embodiments, latent heat may be transferred the fuel cell stack 114 to the fuel for vaporization thereof prior to entering the fuel cell stack 114 in different manners (e.g., the fuel vaporizer may be in contact with the cylindrical portions of the housing 112 (e.g., wrapping around the fuel cell stack 114) and/or another through another heat exchanger (e.g., located downstream of the recuperator 116).

The fuel cell system may be operated in a startup phase and a normal operating phase. During the startup phase, the fuel cell stack 114 is brought up to an operating temperature (e.g., from ambient temperatures to between 600 and 1,000 degrees Celsius, as referenced previously). During the normal operating phase, the fuel cell stack 114 is at the operating temperature and outputs electricity with the electrochemical reaction. Fuel is maintained in the secondary fuel tank 126 in both the startup phase and the normal operating phase, which may allow for replacement the primary fuel tank 122 after use with another primary fuel tank 122 containing more fuel, while maintaining operation of the fuel cell system 100.

During the startup phase, the fuel flows from the secondary fuel tank 126 to the fuel cell stack 114 in a vapor state. For example, the secondary fuel tank 126 may have a conventional vapor-phase takeoff 126a, as referenced above. During the startup phase, the fuel may flow from the primary fuel tank 122 to the fuel vaporizer 124 and flow from the fuel vaporizer 124 to the secondary fuel tank 126 or to the fuel cell stack 114. For example, liquid fuel may flow from the primary fuel tank 122 through the fuel vaporizer 124 to the secondary fuel tank 126, for example, via gravity (e.g., with the primary fuel tank 122 being positioned at least partially above the secondary fuel tank 126, such as an outlet of the primary fuel tank 122 being positioned above the fuel vaporizer and/or an inlet of the secondary fuel tank 126). During the startup phase, the fuel is combusted in the fuel cell stack 114 to increase the temperature thereof and, thereby, increase the temperature of the housing 112 and the fuel vaporizer 124. Later during the startup phase, the fuel passing through the fuel vaporizer will have heated to a temperature and be elevated to a pressure that is above that in the secondary fuel tank 126, such that the fuel passes from the fuel vaporizer 124 to the secondary fuel tank 126 in vapor form.

During the normal operating phase, the fuel flows from the primary fuel tank 122 to the fuel vaporizer 124. The fuel flowing from the primary fuel tank 122 to the fuel vaporizer 124 may be in a liquid state. As the amount of fuel in the primary fuel tank 122 decreases and the pressure decreases, the fuel flowing from the primary fuel tank 122 to the fuel vaporizer 124 may be in a mixed state (i.e., both liquid and vapor states) or in the vapor state.

After passing through the fuel vaporizer 124, the fuel is in the vapor state and flows to the secondary fuel tank 126 or may alternatively flow directly to the fuel cell stack 114 (i.e., without passing through the secondary fuel tank 126, such as in the embodiment of the fuel cell system 100 having the bypass valve 128).

Figure 4A:
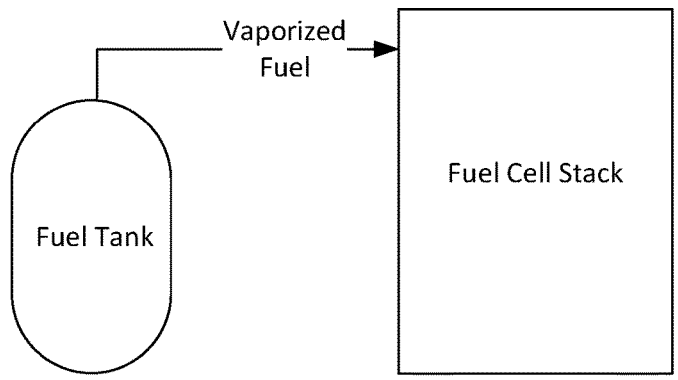
FIG. 4A is a schematic view of a prior art fuel cell system having a fuel cell stack and a fuel tank oriented upright with a vapor-phase takeoff on an upper end thereof.
Figure 4B:
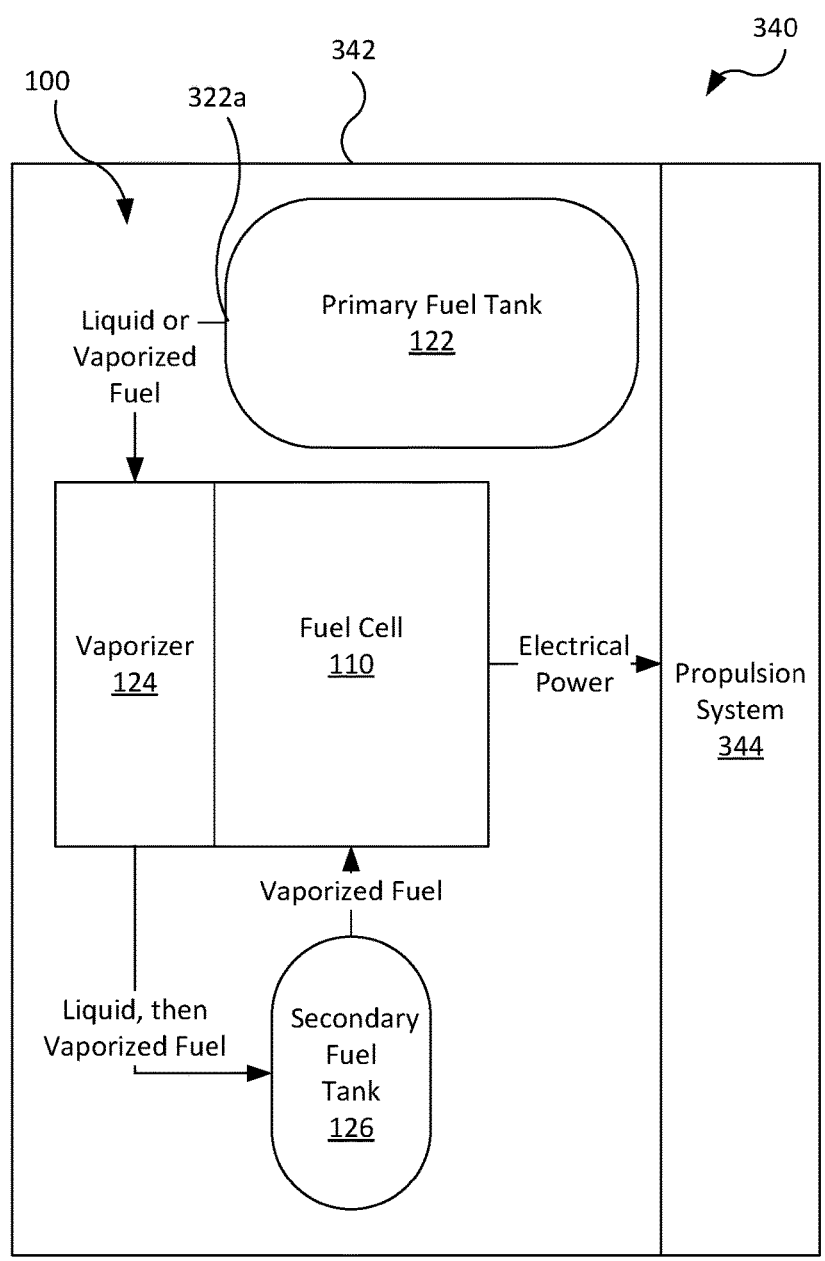
FIG. 4B is a schematic view of the fuel cell system of FIG. 1 illustrating components of the fuel system in vertical position and orientation relative to each other and the fuel cell stack.

Referring to FIGS. 4A and 4B, the fuel cell system 100 provides various advantages due to the fuel system 120 including the fuel vaporizer 124 and the secondary fuel tank 126. As shown in FIG. 3A, conventional fuel system may include a fuel tank that is arranged upright with a vapor takeoff positioned at the top of the tank, which provides that the fuel is delivered to the fuel cell stack in vapor form. However, this limits the orientation of the fuel tank and, thereby, the packaging of the fuel tank in the usage environment thereof, which may be in a stationary location or a moving vehicle (e.g., an unmanned aerial vehicle (UAV)). With the fuel system 120 of the fuel cell system 100, the fuel vaporizer 124 and the secondary fuel tank 126 function to ensure that the fuel is still delivered to the fuel cell stack 114 in only vapor form, while allowing for other orientations and, thereby, different types of fuel tanks (e.g., material) and packaging thereof within the usage environment. As shown in FIG. 3B, the primary fuel tank 122 may one or more of: be positioned above the fuel cell stack 114, be positioned partially or fully above the secondary fuel tank 126, be positioned partially or fully above the fuel vaporizer 124, include the outlet 322a positioned not proximate an upper ended thereof (e.g., at a mid-height thereof) and/or to allow fuel to flow from the primary fuel tank 122 in liquid form), and/or be orientated in a non-upright manner (e.g., such that an axis thereof extends in an approximately horizontal arrangement in use, such as being elongated in a substantially horizontal direction). The fuel cell system 100 may, for example, be positioned within the body 342 of a vehicle 340, such as within the fuselage and/or wings of an unmanned aerial vehicle that further includes a propulsion system 344 (e.g., rotors and/or propellers with at least one electric motor) powered by the fuel cell system 100.

Figure 5:
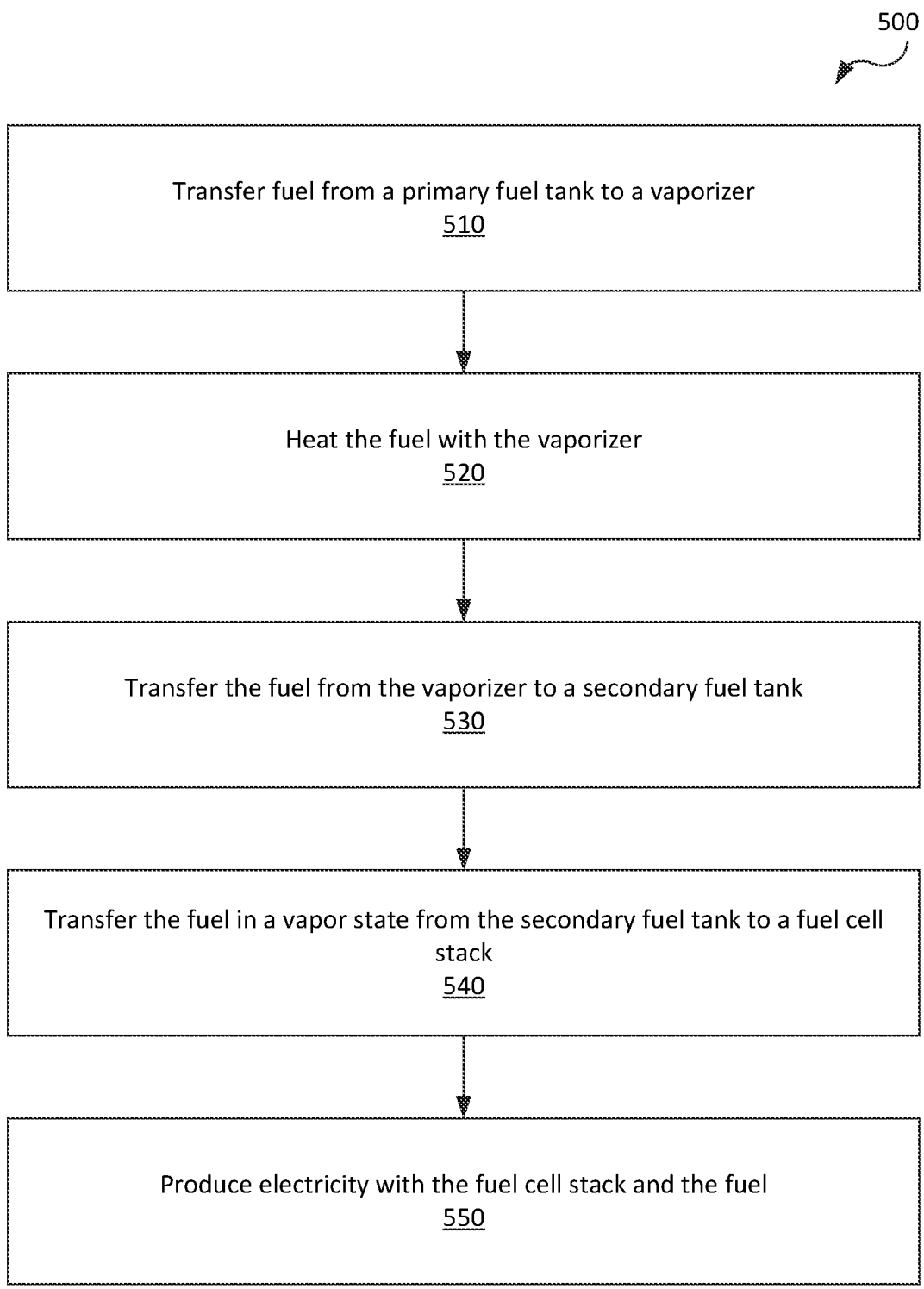
FIG. 5 is a flowchart of a method for operating a fuel cell.

Referring to FIG. 5, a method 500 is provided for operating a fuel cell. The method generally includes transferring 510 fuel from a primary fuel tank to a fuel vaporizer, heating 520 the fuel in the fuel vaporizer, transferring 530 the fuel in a vapor state from the fuel vaporizer to a secondary fuel tank, transferring 540 the fuel in a vapor state from the secondary fuel tank to a fuel cell stack of the fuel cell, and producing 550 electricity with the fuel cell stack with the fuel.

The transferring 510 of the fuel from the primary fuel tank to the fuel vaporizer, includes permitting the fluid to flow from the primary fuel tank, such as the primary fuel tank 122, to the fuel vaporizer, such as the fuel vaporizer 124. For example, a regulator, such as the regulator 118, located between the secondary fuel tank, such as the secondary fuel tank 126, and a fuel cell stack, such as the fuel cell stack 114, may be selectively operated to permit (e.g., release) fuel to flow from the secondary fuel tank (e.g., being opened) to the fuel cell stack. The primary fuel tank, the fuel vaporizer, and the secondary fuel tank may be an open system, as described previously, that allows the fuel to flow freely therebetween, such that by releasing the fuel to flow from the secondary fuel tank to the fuel cell stack, fuel then flows from the primary fuel tank to the fuel vaporizer to, ultimately, flow to and replenish the fuel released from the secondary fuel tank.

The heating 520 of the fuel is performed with the fuel vaporizer. The fuel vaporizer transfers heat from the fuel cell stack to the fuel passing therethrough, for example, with conductive tubing, such as the conductive tubing 124a, being in conductive contact with a housing, such as the housing 112, that contains the fuel cell stack. During steady state operation of the fuel cell stack 114, the fuel is heated sufficiently such that the fuel leaving the fuel vaporizer is in the vapor state.

The transferring 530 of the fuel from the fuel vaporizer to the secondary fuel tank, includes permitting (e.g., releasing) the fluid to flow therefrom. As described above with respect to the transferring 510, transferring of the fuel from the fuel vaporizer to the secondary fuel tank may controlled by regulator, such that when fuel is released by the regulator from the secondary fuel tank to the fuel cell stack, the fuel may flow from the fuel vaporizer to the secondary fuel tank. During stead state operation, the fuel is transferred from the fuel vaporizer to the secondary fuel tank in the vapor state. During the startup operation, or otherwise prior to the normal or steady state operation of the fuel cell stack, the transferring 530 may include transferring the fluid in the liquid state or a mixed state.

The transferring 540 of the fuel in the vapor state from the secondary fuel tank to the fuel cell stack is controlled by the regulator. For example, the secondary fuel tank may include a vapor takeoff (e.g., at an upper end thereof), such as the vapor-phase takeoff 126a, that ensures that the fuel is transferred from the secondary fuel tank to the fuel cell stack in the vapor state.

The producing 550 of electricity with the fuel is performed by the fuel cell stack. As referenced above and as generally known for fuel cells, the fuel cell stack performs an electrochemical reaction with the fuel to output the electricity.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A fuel cell system comprising:
  a fuel cell having a housing and a fuel cell stack positioned in the housing, the fuel cell stack being configured to produce an electrochemical reaction from a fuel and air to output electricity;
  a fuel system having a fuel source, a fuel vaporizer, and fuel lines through which the fuel flows from the fuel source to the fuel vaporizer and from the fuel vaporizer to the fuel cell stack; and
  a second fuel tank and a regulator arranged between the secondary fuel tank and the fuel cell stack, wherein the fuel source is a first fuel tank, and the regulator is selectively operated to control flow of the fuel from the secondary fuel tank to the fuel cell stack;
  wherein the fuel vaporizer includes a conductive tube through which the fuel flows, the conductive tube being in contact with the housing to conduct heat from the housing to the fuel to vaporize the fuel; and
  wherein the flow of the fuel from the first fuel tank through the fuel vaporizer to the second fuel tank is controlled by operating the regulator.

2. The fuel cell system according to claim 1, further comprising a regulator;
  wherein the fuel cell is a solid oxide fuel cell that has an operating temperature of between approximately 600 and 1,000 degrees Celsius, the housing is insulated and has a surface temperature that does not exceed 150 degrees Celsius during operation of the fuel cell, and the fuel system delivers the fuel to the fuel cell stack at up to 400 grams/hour;
  wherein the fuel source is a first fuel tank, the fuel system includes a second fuel tank, and the fuel flows from the first tank to the fuel vaporizer through one of the fuel lines, and during a normal operation phase after a startup phase, the fuel flows from the first tank to the fuel vaporizer and from the fuel vaporizer to the second fuel tank in the vapor state;
  wherein the regulator is arranged between the second fuel tank and the fuel cell stack, the regulator is selectively operated to control flow of the fuel from the second fuel tank to the fuel cell stack, the flow of the fuel from the first fuel tank through the fuel vaporizer to the second fuel tank is controlled by operating the regulator; and
  wherein the first fuel tank positioned at least partially above the second fuel tank, the first fuel tank includes a fuel outlet that is positioned at an approximate mid-height thereof, and the first fuel tank is elongated in a substantially horizontal direction.

3. The fuel cell system according to claim 1, wherein the fuel cell is a solid oxide fuel cell that has an operating temperature of between approximately 600 and 1,000 degrees Celsius.

4. The fuel cell system according to claim 3, wherein the housing is insulated and has a surface temperature that does not exceed 150 degrees Celsius during operation of the fuel cell.

5. The fuel cell system according to claim 4, wherein the fuel system delivers fuel at up to 400 grams/hour.

6. The fuel cell system according to claim 1, wherein the fuel system includes a first tank, and the fuel flows from the first tank to the fuel vaporizer through one of the fuel lines.

7. The fuel cell system according to claim 6, wherein the fuel system includes a second tank.

8. The fuel cell system according to claim 7, wherein during a startup phase during which the fuel cell is below an operating temperature of between approximately 600 and 1,000 degrees Celsius, the fuel may flow from the first tank to the fuel vaporizer and the second tank in a liquid state, and the fuel flows from the second tank to the fuel cell stack in a vapor state.

9. The fuel cell system according to claim 8, wherein during a normal operation phase after the startup phase and during which the fuel cell is at the operating temperature, the fuel from the fuel vaporizer to the fuel cell stack in the vapor state.

10. The fuel cell system according to claim 9, wherein during the normal operation phase, the fuel flows through the fuel lines from the first tank to the fuel vaporizer, from the fuel vaporizer to the second tank, and from the second tank to the fuel cell stack in the vapor state.

11. The fuel cell system according to claim 1, wherein the first fuel tank is positioned at least partially above the second fuel tank.

12. The fuel cell system according to claim 11, wherein the first fuel tank includes a fuel outlet that is positioned at an approximate mid-height.

13. The fuel cell system according to claim 12, wherein the first fuel tank is elongated in a substantially horizontal direction.

14. An unmanned aerial vehicle comprising:
a fuselage;
a propulsion system coupled to the fuselage and configured to propel the unmanned aerial vehicle through the air, the propulsion system including at least one electric motor; and
a fuel cell system configured to provide power to the at least one electric motor, wherein the fuel cell system includes:
a fuel cell having a housing and a fuel cell stack positioned in the housing, the fuel cell stack being configured to produce an electrochemical reaction from a fuel and air to output electricity; and
a fuel system having a fuel source, a second fuel tank, a fuel vaporizer, and fuel lines through which the fuel flows from the fuel source to the fuel vaporizer and from the fuel vaporizer to the fuel cell stack;
wherein the fuel vaporizer includes a conductive tube through which the fuel flows, the conductive tube being in contact with the housing to conduct heat from the housing to the fuel to vaporize the fuel; and
wherein the fuel source is a first fuel tank that is positioned at least partially above the second fuel tank, and the first fuel tank includes a fuel outlet that is positioned at an approximate mid-height thereof.

15. The unmanned aerial vehicle according to claim 14, further comprising a regulator;
wherein the fuel cell is a solid oxide fuel cell that has an operating temperature of between approximately 600 and 1,000 degrees Celsius, the housing is insulated and has a surface temperature that does not exceed 150 degrees Celsius during operation of the fuel cell, and the fuel system delivers the fuel to the fuel cell stack at up to 400 grams/hour;
wherein the fuel flows from the first tank to the fuel vaporizer through one of the fuel lines, and during a normal operation phase after a startup phase, the fuel flows from the first tank to the fuel vaporizer and from the fuel vaporizer to the second fuel tank in the vapor state;
wherein the regulator is arranged between the second fuel tank and the fuel cell stack, the regulator is selectively operated to control flow of the fuel from the second fuel tank to the fuel cell stack, the flow of the fuel from the first fuel tank through the fuel vaporizer to the second fuel tank is controlled by operating the regulator; and
wherein the first fuel tank is elongated in a substantially horizontal direction.

16. The unmanned aerial vehicle according to claim 14, wherein the first fuel tank is elongated in a substantially horizontal direction.

17. A fuel cell system comprising:
a fuel cell having a housing and a fuel cell stack positioned in the housing, the fuel cell stack being configured to produce an electrochemical reaction from a fuel and air to output electricity; and
a fuel system having a fuel source, a second tank, a fuel vaporizer, and fuel lines through which the fuel flows from the fuel source to the fuel vaporizer and from the fuel vaporizer to the fuel cell stack;
wherein the fuel vaporizer includes a conductive tube through which the fuel flows, the conductive tube being in contact with the housing to conduct heat from the housing to the fuel to vaporize the fuel;
wherein the fuel source is a first fuel tank positioned at least partially above the second fuel tank; and
wherein the primary fuel tank includes a fuel outlet that is positioned at an approximate mid-height.

18. The fuel cell system according to claim 17, wherein the primary fuel tank is elongated in a substantially horizontal direction.

19. The fuel cell system according to claim 18, wherein the fuel system includes a regulator, the regulator is selectively operated to control flow of the fuel from the secondary fuel tank to the fuel cell stack, and wherein flow of the fuel from the first fuel tank through the fuel vaporizer to the second fuel tank is controlled by operating the regulator.

* * * * *